US010036441B2

(12) United States Patent
Drewes (10) Patent No.: US 10,036,441 B2
(45) Date of Patent: Jul. 31, 2018

(54) BRAKE SYSTEM (71) Applicant: SAF-HOLLAND GmbH, Bessenbach (DE)

(72) Inventor: Olaf Drewes, Aschaffenburg (DE)

(73) Assignee: SAF-HOLLAND GmbH, Bessenbach (DE)

(*) Notice: Subject to any disclaimer, the term of this patent is extended or adjusted under 35 U.S.C. 154(b) by 0 days.

(21) Appl. No.: 15/321,809

(22) PCT Filed: Jun. 29, 2015

(86) PCT No.: PCT/EP2015/064649
§ 371 (c)(1),
(2) Date: Mar. 2, 2017

(87) PCT Pub. No.: WO2016/001114
PCT Pub. Date: Jan. 7, 2016

(65) Prior Publication Data
US 2017/0167554 A1 Jun. 15, 2017

(30) Foreign Application Priority Data
Jul. 3, 2014 (DE) .................. 10 2014 212 897

(51) Int. Cl.
F16D 51/00 (2006.01)
F16D 65/22 (2006.01)
F16D 125/66 (2012.01)
(52) U.S. Cl.
CPC .......... F16D 65/22 (2013.01); F16D 2125/66 (2013.01); F16D 2200/0026 (2013.01);
(Continued)

(58) Field of Classification Search
CPC ...... F16D 65/22; F16D 65/18; F16D 2121/14; F16D 2121/24; F16D 2125/40;
(Continued)

(56) References Cited

U.S. PATENT DOCUMENTS 2,009,096 A 7/1935 Sanford
2,012,647 A 8/1935 Wadsworth
(Continued)

FOREIGN PATENT DOCUMENTS

CN 1085170 4/1994
CN 1573157 2/2005
(Continued)

OTHER PUBLICATIONS

European Patent Office; International Search Report; dated Dec. 2, 2015.

Primary Examiner — Pamela Rodriguez
(74) Attorney, Agent, or Firm — Price Heneveld LLP (57) ABSTRACT The invention relates to a brake system, in particular wedge drum brake for utility vehicles, comprising a transmission element and a piston element, wherein the transmission element is guided displaceably along a transmission axis, wherein the piston element is guided displaceably transversely with respect to the transmission axis, wherein the transmission element has a transmission surface which is oriented in an inclined manner with respect to the transmission axis, wherein the piston element is supported with a piston surface on the transmission surface, wherein a displacement of the transmission element along the transmission axis brings about a displacement of the piston element substantially transversely with respect to the transmission axis.

17 Claims, 4 Drawing Sheets (52) U.S. Cl.
CPC ............... *F16D 2200/0039* (2013.01); *F16D 2250/0038* (2013.01)

(58) Field of Classification Search
CPC ............. F16D 2125/66; F16D 2125/24; F16D 2125/26; F16D 2127/10; F16D 2200/0026; F16D 2200/39; F16D 2250/0038; B60T 2270/83
USPC ......... 188/343, 74, 78, 324, 325, 71.1, 72.1, 188/72.5, 72.7
See application file for complete search history.

(56) References Cited

U.S. PATENT DOCUMENTS

| | | | |
|---|---|---|---|
| 2,077,943 A | | 4/1937 | Linsley |
| 2,140,750 A | | 12/1938 | Kliesrath |
| 2,160,308 A | | 5/1939 | Edmonds |
| 3,194,349 A | * | 7/1965 | Kershner ............... F16D 55/224 188/196 B |
| 8,863,914 B2 | * | 10/2014 | Herges ................... F16D 65/18 188/156 |

FOREIGN PATENT DOCUMENTS

| | | |
|---|---|---|
| DE | 2324037 | 11/1973 |
| DE | 102006002308 | 7/2007 |
| EP | 0208937 | 1/1987 |
| FR | 2834263 | 7/2003 |
| GB | 1263999 | 2/1972 |
| JP | 596439 | 1/1984 |

\* cited by examiner

BRAKE SYSTEM

BACKGROUND OF THE INVENTION

The present invention relates to a brake system, in particular to a wedge drum brake for utility vehicles.

Brake systems and, among the latter, wedge drum brakes, are already known from the prior art. A wedge-shaped geometry is driven here by a brake cylinder, is acted upon with a force and is pressed between two force transmission elements which are connected to the brake shoes of a drum brake and press said brake shoes outward against the inner side of the brake drum. For the transmission of force between the wedge-shaped transmission element and the brake shoes, use has been made up to now of rolling bodies which roll along the wedge-shaped geometry of the transmission element and transmit a force between the transmission element and the brake shoes. It has been shown that the brake systems known from the prior art are disadvantageous in particular with regard to their overall size since the arrangement of the rolling bodies together with the required rolling body cages requires a very large amount of construction space. Furthermore, the production of such brake systems is complicated since the increased number of components and sometimes filigrane geometries, in particular in the region of the rolling body cage, not only require a multiplicity of components to be manufactured separately, but also require a relatively high expenditure of time for the installation or removal of the brake system. There is therefore a need to improve brake systems in respect of the construction space taken up by the brake system and in respect of the simplicity of the manufacturing and the reduction in the outlay on installation or removal.

It is the object of the present invention to provide a brake system with a reduced requirement for construction space and a reduced weight and which is nevertheless capable of applying the required braking forces and which can be fitted in a simple manner.

SUMMARY OF THE INVENTION

According to the invention, the brake system, in particular a wedge drum brake for utility vehicles, comprises a transmission element and a piston element, wherein the transmission element is guided displaceably along a transmission axis, wherein the piston element is guided displaceably transversely with respect to the transmission axis, wherein the transmission element has a transmission surface which is oriented in an inclined manner with respect to the transmission axis, wherein the piston element is supported with a piston surface substantially directly on the transmission surface, wherein a displacement of the transmission element along the transmission axis causes a displacement of the piston element substantially transversely with respect to the transmission axis. The transmission element is advantageously the wedge element of a wedge drum brake and is guided displaceably along a transmission axis, wherein the transmission element advantageously has a main direction of extent which runs parallel to the transmission axis. At a first end of the transmission element, the latter preferably engages on a brake cylinder and is acted upon with an actuating force by the brake cylinder. In the direction opposing the actuating force of the brake cylinder, the transmission element is advantageously acted upon with a restoring force which attempts to displace the transmission element out of engagement with the piston element. At its second end opposite the first end, the transmission element has a transmission surface which is oriented in an inclined manner with respect to the transmission axis. The transmission surface advantageously does not have any portion which is oriented parallel to the transmission axis. Displaceable guidance of the transmission element along the longitudinal axis means, in other words, that a displacement of the transmission element is possible only in this direction, whereas the transmission element is correspondingly secured or supported transversely with respect to the transmission axis by, for example, the housing of the brake system. The piston element of the brake system is preferably likewise arranged here in the housing thereof and is secured against displacement along or parallel to the transmission axis and is displaceable in a direction substantially transversely with respect to the transmission axis. Within the context of the present invention, "substantially transversely with respect to the transmission axis" means that manufacturing tolerances and a slightly oblique displacement direction with respect to the transmission axis can be provided. In this connection, in particular angles of 80° to 100° between the displacement direction of the piston element and the transmission axis are permissible within the context of the present invention since non-uniform forces at the brake shoes can thereby be compensated for. The piston element has a piston surface which is supported at least in regions on the transmission surface of the transmission element. Owing to the inclined orientation of the transmission surface with respect to the transmission axis, displacement of the transmission element along the transmission axis leads to displacement of the piston element transversely with respect to the transmission axis. In other words, the piston element is supported on the transmission element and on the transmission surface thereof in such a manner that, at the beginning of a displacement of the transmission element, the piston element is first of all connected to a portion of the transmission surface that is arranged closer to the transmission axis than after a further displacement of the transmission element along the transmission axis, after which the piston element is connected to a portion of the transmission surface that is further away from the transmission axis. Consequently, during this displacement movement of the transmission element, the piston element slides substantially directly on the transmission surface of the transmission element. "Substantially directly" means here that in particular no rotating bodies, such as, for example, rolling bodies, are arranged between the transmission surface and the piston surface in order to transmit the force between transmission element and piston element. Furthermore preferably, also no non-rotating intermediate piece is arranged between the piston surface and the transmission surface. By means of the omission of components arranged between the piston surface and the transmission surface, the construction space required by the brake system can in particular be significantly reduced, wherein the housing of the brake system can also be designed to be smaller and in this way weight can also be saved. However, within the context of the present invention, it is provided that a lubricating film or a lubricating substance is introduced between the piston surface and the transmission surface and reduces the sliding friction between the piston surface and the transmission surface. In this manner, in particular the wear on the respective surfaces of the transmission element and of the piston element can also be reduced.

In a particularly preferred embodiment, the transmission surface and/or the piston surface are/is of curved design. In the preferred case that at least one of the surfaces, transmission surface or piston surface, is of curved design, in particular the sliding surface formed between transmission surface and piston surface can be reduced. In this manner, in particular the sliding resistance of the brake system between transmission surface and piston surface can be reduced. In a preferred embodiment, both the transmission surface and the piston surface are of curved design at least in sections. In this embodiment, it is advantageously possible firstly for the contact surface between transmission surface and piston surface to be reduced and secondly for a different rise of the transmission surface with respect to the transmission axis to be set at various displacement positions of the transmission element along the transmission axis. A progressive characteristic can thus advantageously be set between the force to be applied to the transmission element and a force which results therefrom and displaces the piston element away from the transmission axis. In other words, the rise at the distal end of the transmission element, at which the transmission surface protrudes away from the transmission axis, is greater than on that portion of the transmission surface which lies opposite the distal end of the transmission element. This ensures that, when the transmission element is acted upon with a force by the brake cylinder, said transmission element is first of all displaced with a high rise of its transmission surface in relation to the piston element, and the piston element is first of all displaced to a very great extent away from the transmission axis, wherein, when the maximum braking force to be applied by the brake system is achieved at the maximum displacement of the transmission element along the transmission axis, said transmission axis transmits an exponentially increased force to the piston element as the force on the transmission element increases linearly. In this preferred embodiment, the corresponding travel diagram, that is to say the displacement travel of the piston element plotted over the displacement travel of the transmission element, is correspondingly degressive. The curvature of the transmission surface and/or of the piston surface is preferably cylindrical, wherein a preferred linear or rectangular contact region arises between the piston element and the transmission element. Higher forces can thereby be transmitted, wherein, however, higher sliding friction has to be accepted. Particularly preferably, the curvature of the transmission surface and/or of the piston surface is of spherical design, wherein spherical in the present case should be understood as meaning spherical-shell-shaped or else barrel-shaped. In this preferred embodiment, a punctiform or circular or elliptical contact region arises between the piston element and the transmission element, wherein, advantageously, very low sliding friction occurs.

In a particularly preferred embodiment, the curvature of the transmission surface and/or of the piston surface can also consist in a sequence of in each case rectilinear portions which are each pivoted by an angle, which differs from a straight line, of 0° to 10°, preferably 0° to 5°, and are adjacent to one another. The row of linear portions or, in other words, preferably rectilinear portions of the transmission surface and/or of the piston surface forms an arc-shaped geometry. Particularly preferably, the portions of the transmission surface and/or of the piston surface can be designed or arranged here as tangents of a portion of a circular arc.

In a further preferred embodiment, the transmission surface or the piston surface has a concave curvature, wherein the other surface in each case, i.e. piston surface or transmission surface, has a convex curvature, wherein the radius of curvature of the convex curvature is preferably smaller than the radius of curvature of the concave curvature. In this case, the radius of curvature is preferably assumed to be the average radius of curvature, wherein it can be provided within the context of the present invention that the actual local radius of curvature changes along a curvature. By means of the preferred combination of a concave curvature on one of the components (transmission element or piston element) with a convex curvature on the other component in each case (transmission element or piston element), in particular the Hertzian stress or stress concentrations in the material, caused by surface pressure, can be reduced since one surface always surrounds the other corresponding surface in each case at least in regions.

In a furthermore preferred embodiment, the transmission surface or the piston surface has a first curvature with a first average radius of curvature, wherein the other surface in each case has a second curvature with a second average radius of curvature, wherein the first average radius of curvature is at a ratio of 0.4 to 1, preferably 0.5 to 0.95 and particularly preferably of approx. 0.7 to 0.85 to the second average radius of curvature. In other words, either the transmission surface or the piston surface therefore has a first average radius of curvature. The surface which in each case does not have the first average radius of curvature accordingly preferably has the second average radius of curvature. Particularly preferably, the first average radius of curvature here is smaller than or equal to the second central radius of curvature, wherein particularly preferably a size ratio of 0.7 to 0.85 is provided. By means of the preferred combination of a first average radius of curvature, which is at a ratio of 0.4 to 1 to the second average radius of curvature, a particularly favorable geometry of the contact surface between the transmission surface and the piston surface can advantageously be achieved. For this purpose, in particular the sliding resistance which occurs during the operation of the brake system because of the friction of the piston surface on the transmission surface can be reduced and at the same time the damage to the two surfaces by the Hertzian stress which occurs is reduced. The particularly preferred ratio of 0.5 to 0.95 of the first average radius of curvature to the second average radius of curvature has proven successful in particular for use in wedge drum brakes of a conventional design, wherein, in said wedge drum brakes, the hitherto customary arrangement of rolling bodies between the wedge and the respective piston elements of the brake shoes can be replaced by the arrangement according to the invention with a curvature at least in regions on the transmission surface and/or piston surface. The particularly preferred ratio of 0.7 to 0.85 has proven successful in trials by the applicant in wedge drum brakes in utility vehicles, wherein in particular higher braking forces have been able to be achieved than was hitherto possible in the case of wedge drum brakes with rolling bodies.

The profile of the curvature of the transmission surface and/or of the piston surface is advantageously non-linear. A geometry which has different radii of curvature and/or curvatures combined with rectilinear portions is considered to be a non-linear profile, or in other words non-uniform or non-constant profile, of the curvature of the transmission surface and/or of the piston surface. The advantage of this non-linearly extending curvature is that a certain movement and force characteristic line between the piston element and the transmission element can be adjusted. Specifically designed rises of the transmission surface and/or of the piston surface can be designed here for certain positions of the transmission element in the brake system, said rises permitting a favorable transmission of force with little wear of the force-transmitting surfaces on the transmission element and on the piston element.

Furthermore preferably, the radius of curvature of selected portions of the transmission surface and/or of the piston surface has various values, and/or a portion which is not curved is provided. The configuration of the curvature over the transmission surface and of the respectively corresponding piston surface is, in other words, a means in order to be able to adjust the movement characteristic line of the movement or displacement of the piston element depending on a displacement of the transmission element. In other words, this means that, if the transmission element is shifted for a certain travel distance by the brake cylinder, the configuration or the rise of the transmission surface along the transmission axis is a characteristic variable for adjusting a certain displacement of the piston element by a certain travel distance transversely with respect to the transmission axis. In this connection, it goes without saying that, with a steeper rise of the corresponding portions of the piston surface along the transmission axis, the displacement travel of the piston element transversely with respect to the transmission axis, which displacement travel is caused by a certain displacement distance of the transmission element, is all the more greater. In this case, the stringing together of variously arched or variously curved portions on the transmission surface and/or on the piston surface is a means in order firstly to be able to combine both the favorable surface pressure and sliding friction values on the basis of the curvature of the respective surfaces with a non-linear movement characteristic line of the piston element depending on the movement of the transmission element. It can thereby arise, for example, that, at the beginning of a braking operation, a certain displacement travel of the transmission element, the piston element is intended to cover as large a travel distance as possible, wherein, at said large travel distance, relatively small forces on the piston element should be anticipated and an engagement of a brake shoe driven by the piston element with the inner side of a brake drum rapidly occurs. After a further displacement of the transmission element as far as the state of the brake system in which full braking or the maximum braking force is intended to be achieved, it may be preferred for the rise of the transmission surface along the transmission axis to be relatively small, wherein, by means of a certain displacement travel of the transmission element, only a relatively small displacement travel of the piston element is caused but with, at the same time, very high forces acting on the piston element, as a result of which, in particular preferably, a particularly high braking force can be achieved with the brake system. By means of the non-linear configuration of the curvature of the transmission surface and/or of the piston surface, it is therefore possible, starting from a uniform or constant shifting of the transmission element, to provide a non-constant or non-proportional movement characteristic or movement characteristic line of the piston element, which leads to a certain displacement of the brake shoes and therefore to a preferred braking characteristic. It may also be preferred here for a non-curved portion to be provided between two curved portions of the curvature of the transmission surface and/or of the piston surface, said non-curved portion therefore leading to a rectilinear rise of the movement characteristics of the piston element. In this way, in particular whenever the surface of the other element in each case, which surface corresponds in each case to the rectilinear portion of one of the elements (piston element or transmission element), is curved, the advantages of a curved design of the transmission surface and/or of the piston surface are combined with a rectilinear rise and therefore with a force on the piston element, the force rising constantly as the force on the transmission element increases.

Particularly preferably, in a first state of the brake system, the transmission surface in a first transmission portion lies against a first piston portion of the piston surface, wherein, in a second state of the brake system, the transmission surface in a second transmission portion lies against a second piston portion of the piston surface, wherein the first transmission portion extends substantially pivoted about a first angle with respect to the transmission axis, wherein the second transmission portion extends substantially pivoted about a second angle with respect to the transmission axis, wherein the second angle is preferably of a smaller value than the first angle. The first state of the brake system is in particular the state at the beginning of a braking operation, wherein, in this state, the piston element is preferably positioned closest to the transmission axis and the transmission element enters precisely into engagement with the piston element without, however, already having to displace the piston element transversely with respect to the transmission axis. The second state of the brake system is preferably the state at which the maximum braking force is caused or applied by the brake system. In particular preferably, the transmission element is displaced here to the maximum extent along the transmission axis away from the brake cylinder and the piston element is at its greatest distance from the transmission axis. In the first state of the brake system, the transmission surface corresponds here in a first transmission portion to a first piston portion of the piston surface, wherein the first transmission portion and preferably also the first piston portion are oriented in a manner pivoted by a first angle with respect to the transmission axis. Analogously thereto, in the second state of the brake system, the transmission surface lies in a second transmission portion against a second piston portion of the piston surface. The second transmission axis and preferably also the second piston portion extends here in a manner substantially pivoted about a second angle with respect to the transmission axis. In this context, "substantially pivoted about a first or second angle" means that, if the first and/or the second transmission portion is designed to be slightly arched, the first or the second angle is intended to be measured in each case at a straight line which runs through the end points of the respective arching of the first or of the second transmission portion. The first angle here preferably has a greater value than the second angle, as a result of which, in other words, the first transmission portion is oriented steeper with respect to the transmission axis than the second transmission portion. With this preferred embodiment, the effect can be achieved in particular that, at the beginning of a braking operation, with a constant displacement speed of the transmission element along the transmission axis, a greater displacement distance of the piston element is achieved than in the second state of the brake system. In the second state of the brake system, greater forces can be transmitted to the piston element with a uniform displacement of the transmission element, as a result of which a higher braking force is achieved by the brake system. This improves both the response behavior of the brake in the first state of the brake system and the maximum braking force of the brake system that is possible to achieve.

In a further embodiment, when the brake system is actuated, the transmission surface and the piston surface lie on one another in a sliding portion, wherein the sliding portion takes up 0.05 to 0.3 times, preferably 0.05 to 0.2 times and in particular preferably approx. 0.08 to 0.12 times the transmission surface and/or the piston surface. The sliding portion is, of course, displaced during a displacement of the transmission element along the transmission axis preferably both along the transmission surface and along the piston surface. The surface or the cross-sectional area of the sliding portion determines here the sliding friction surface relevant for the sliding friction between transmission element and piston element. Within the context of the present invention, it is preferred in particular for said sliding surface to be kept as small as possible, wherein, however, at the same time the sliding surface as the effective force transmission surface between transmission element and piston element should not be kept too small in order to keep the effects of the surface pressure and the material damage resulting therefrom small. Within the context of the present invention, a surface ratio of 0.05 to 0.3 of the sliding portion with respect to the cross-sectional area of transmission surface or piston surface has turned out to be advantageous in order, firstly, to keep the sliding friction between piston element and transmission element small and, secondly, to be able to transmit sufficiently high forces between the two surfaces. The surface ratio of 0.05 to 0.2 has proven successful here and turned out to be advantageous in particular in the sphere of wedge drum brakes for utility vehicles, in which conventional materials, such as, for example, conventional hardened steel and conventional lubricants are intended to be used. The particularly preferred ratio of 0.08 to 0.12 can be advantageously used here for highly loaded brake systems in which a particularly high demand is placed on the rapid operability of the brake, wherein, in particular, only a very small sliding friction should occur in comparison to the brake systems in which 0.3 times the surface of the sliding portion with respect to the transmission surface and/or the piston surface is permissible.

Particularly preferably, the geometry of the transmission surface and/or of the piston surface is configured in such a manner that the sliding portion is smaller in the first state of the brake system than in the second state of the brake system. The sliding portion, i.e. the portion which, between transmission surface and piston surface, transmits the corresponding displacement force which acts on the piston element, is therefore preferably smaller in the first state of the brake system than in the second state. In this manner, in the first state of the brake system, a lower sliding friction can be achieved between transmission element and piston element, while, in the second state of the brake system, the higher forces acting between transmission surface and piston surface are transmitted in a manner distributed over a larger sliding portion. By this means, the maximum stress, which is caused by Hertzian stress, in the material of the transmission element and of the piston element can be reduced and the service life of the two components can be increased. The preferred means for configuring the geometry of the transmission surface and of the piston surface is the corresponding adaptation of the curvature of the respectively corresponding portions of piston surface and transmission surface. It can therefore be provided in particular that, in the region of the transmission surface and the piston surface, which correspond to each other in the first state, smaller radii of curvature and therefore a "more acute-angled" transmission geometry are provided on the transmission surface and the piston surface than in the regions of the transmission surface and/or of the piston surface which correspond to each other in the second state of the brake system. Therefore, for example, the radius of curvature of the transmission surface at its end facing the brake cylinder is preferably greater than at its end facing away from the brake cylinder.

In particular preferably, the transmission surface and/or the piston surface comprises a hardened material. In particular, a hard chromium plated surface coating can be provided here as the hardened material, wherein said surface coating can be formed directly with the material of the transmission surface and/or of the piston surface. In this embodiment, the production of the piston element or of the transmission element can advantageously be realized as simply as possible. Furthermore preferably, the hardened material can also be applied in the form of a coating, such as, for example, a hard chromium plated surface coating, to the transmission surface and/or the piston surface, wherein, in particular for the repair of worn transmission elements and piston elements, said coating can be renewed simply and relatively cost-effectively and the operating costs for a brake system according to the present invention can be reduced. Furthermore preferably, ceramic portions can also be provided on the transmission surface and/or on the piston surface, wherein ceramic is usable in particular for transmitting compression forces with at the same time only small sliding friction and low frictional wear.

In a particularly preferred embodiment, the transmission surface comprises a transmission-side receiving region and/or the piston surface comprises a piston-side receiving region which is designed for providing and distributing a lubricant between the transmission surface and the piston surface. The transmission-side receiving region and/or the piston-side receiving region is particularly preferably provided with lubricant pockets in which a lubricant can be stored and is distributed continuously between the transmission surface and the piston surface. Particularly preferably, the transmission-side receiving region and/or the piston-side receiving region comprise grooves which are introduced into the respective surface and are designed to distribute a lubricant, such as, for example, a grease or a viscous oil, uniformly over the transmission surface and/or the piston surface while the brake system is in use and the transmission surface is displaced relative to the piston surface. In this connection, it has turned out to be particularly advantageous that a special microsurface structure is provided on the transmission surface and/or on the piston surface, said microsurface structure firstly withstanding the high surface loads, which act between the transmission surface and the piston surface, without damage and secondly promotes the uniform distribution of a lubricant, as a result of which in particular the wear at the transmission surface and at the piston surface can be significantly reduced and the sliding friction drops to a minimum. A microsurface structure refers in particular to groove-shaped channels in the surface of the transmission surface and/or of the piston surface, wherein the channels have a width and a depth of 100 NM to 2 μm.

Particularly preferably, a lubricating film is provided between the transmission surface and the piston surface. It has been demonstrated here that in particular the curved or preferably spherical surface shape both on the transmission surface and on the piston surface is suitable to ensure in each movement state of the transmission element relative to the piston element that the uniform lubricating film between the transmission surface and the piston surface does not tear and therefore a direct metal-on-metal or metal-on-ceramic contact between the two surfaces is always avoided. In the case of direct metal-on-metal contact or metal-on-ceramic contact between the transmission surface and the piston surface, particularly disadvantageous wear occurs, and it is preferred within the context of the invention that there is always a lubricating film between the two surfaces, the lubricating film both reducing the sliding friction and the wear. Particularly preferably, the lubricating film here can also be composed of a graphite or a graphite-like or graphite-containing material, wherein particularly preferably a graphite store can be introduced into the transmission surface and/or the piston surface, the graphite store distributing lubricating graphite between the two surfaces in accordance with demand. A coating, in particular Teflon coating, can also be provided.

Advantageously, the transmission element has a second transmission surface which is preferably designed in a plane-symmetrical manner with respect to the first transmission surface based on a plane running through the transmission axis. The transmission element advantageously therefore serves not only for the drive or the displacement of a piston element, but also of a second piston element which is oriented mirror-symmetrical with respect thereto and is displaceable mirror-symmetrically with respect to the first piston element. The second transmission surface preferably has the same properties here as the first transmission surface and is merely arranged plane-symmetrically with respect to the first transmission surface.

In an alternatively preferred embodiment, it can be that the transmission element has a second transmission surface which is preferably designed in a plane-symmetrical manner with respect to the first transmission surface based on a plane running through the transmission axis. This embodiment can be advantageous in particular if a different brake characteristic is intended to be provided for the leading brake shoe and the trailing brake shoe in the drum brake. In this manner, for example, the second transmission surface can have a greater rise in some sections with respect to the transmission axis than the first transmission surface at the same height with respect to the transmission axis. The leading brake shoe can therefore advantageously be brought later into engagement with the brake drum than the trailing brake shoe. A further decisive factor in this embodiment is that the transmission element in the drum brake is in each case oriented with the correct installation position, that is to say that, for example, the second transmission surface is always oriented in the direction of the trailing brake shoe or in the direction of the piston element which actuates the trailing brake shoe. It is therefore recommended to provide a corresponding geometry on the shaft of the transmission element which can be brought into engagement with the brake cylinder, said geometry signaling the correct installation position or not being able to be inserted into a housing of the brake system without the selection of the correct installation position.

Particularly preferably, for the initiation of a braking operation, the transmission element is acted upon or can be acted upon with an actuating force by a brake cylinder in order periodically to enter into engagement with the piston element. In this connection, the periodic engagement referred to is the normal operation of a brake, that consists in a force being built up at the brake cylinder and being transmitted to the transmission element, as a result of which the transmission element displaces the piston element or the piston elements in such a manner that one or preferably two brake shoes enter into engagement with a brake drum, wherein subsequently the force developed at the brake cylinder is reduced to zero, wherein the transmission element and preferably also the piston element or the piston elements is or are in each case displaced back into their original position by restoring elements, i.e. the position before the beginning of the braking operation. In other words, the transmission element is not a readjustment device or adjustment device. By means of the design according to the invention of the respective contact surfaces, the transmission element and the piston element are preferably configured for periodic use by preferably geometries which reduce the sliding friction and optimize the transmission of force, and a lubricating film being provided. In comparison to brake systems known from the prior art, in the case of the present brake system, in particular a smaller requirement for construction space and also, by means of the advantageous configuration of the force transmission surfaces on the transmission element and the piston element, a higher braking force are possible.

Particularly preferably, the brake system has a housing, wherein the transmission element is arranged in the housing and is guided along the transmission axis in the housing, wherein the piston element is arranged in the housing and is guided displaceably in the housing transversely with respect to the transmission axis, wherein the housing is advantageously of integral design. In order to increase the compactness of the brake system, it is particularly preferred for all the systems of the brake system to be accommodated or surrounded in a housing. It is particularly preferred here for at least the transmission element and the piston element and possibly restoring elements acting on the transmission element or the piston element to be accommodated in the housing, to be guided displaceably and in each case supported transversely with respect to the displacement directions. Furthermore preferably, the housing can also be configured for the introduction at regular intervals of a lubricant into the interior space of the housing, the lubricant in a simple manner providing a lubricating film between the transmission surface and the piston surface. For this purpose, the housing is preferably equipped with seals and has a lubricating nipple, wherein, by means of the corresponding seals which act, for example, between the housing of the respective outer surfaces of the piston element and of the transmission element, an escape of lubricant can be prevented. Particularly preferably, the housing here is of integral design. This is preferred in particular because of the favorable manufacturing of the housing since the housing can be produced as a single-piece cast part and requires only a few further machining steps, as a result of which the manufacturing time can be significantly reduced. Furthermore preferably, the housing can therefore be optimally adapted to the corresponding size of the transmission element and of the piston elements, wherein in particular the weight and requirement for construction space of the housing and of the entire brake system can be significantly reduced.

BRIEF DESCRIPTION OF THE DRAWINGS

Further advantages and features of the present invention emerge from the description below of further preferred embodiments with respect to the attached figures. It goes without saying that features of individual embodiments or figures can also be used in other embodiments unless this is explicitly ruled out or forbidden because of technical considerations. In the figures.

DETAILED DESCRIPTION OF THE PREFERRED EMBODIMENTS

Figure 1A:
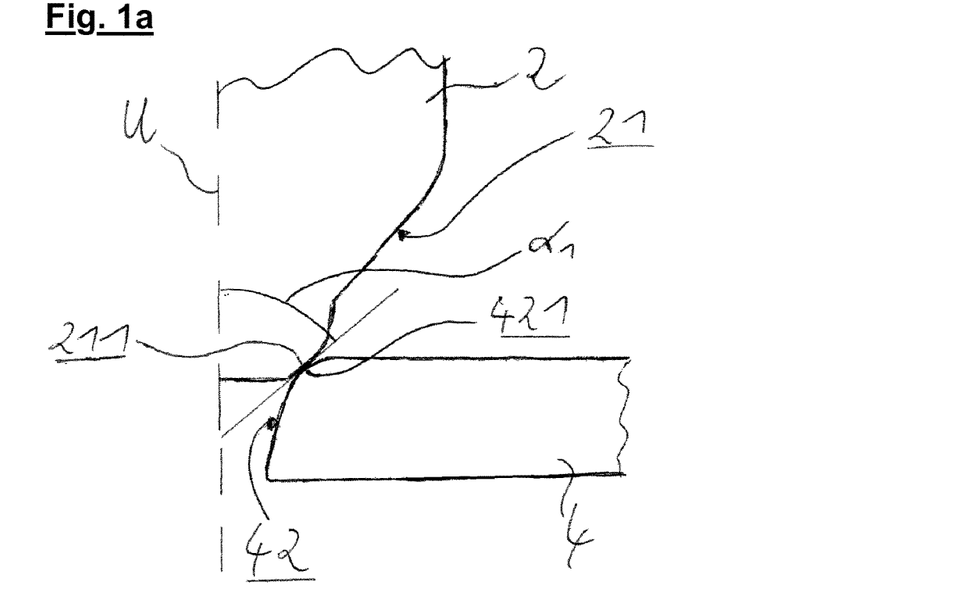
FIGS. 1a, 1b show two views of a preferred embodiment of the brake system according to the invention.
Figure 1B:
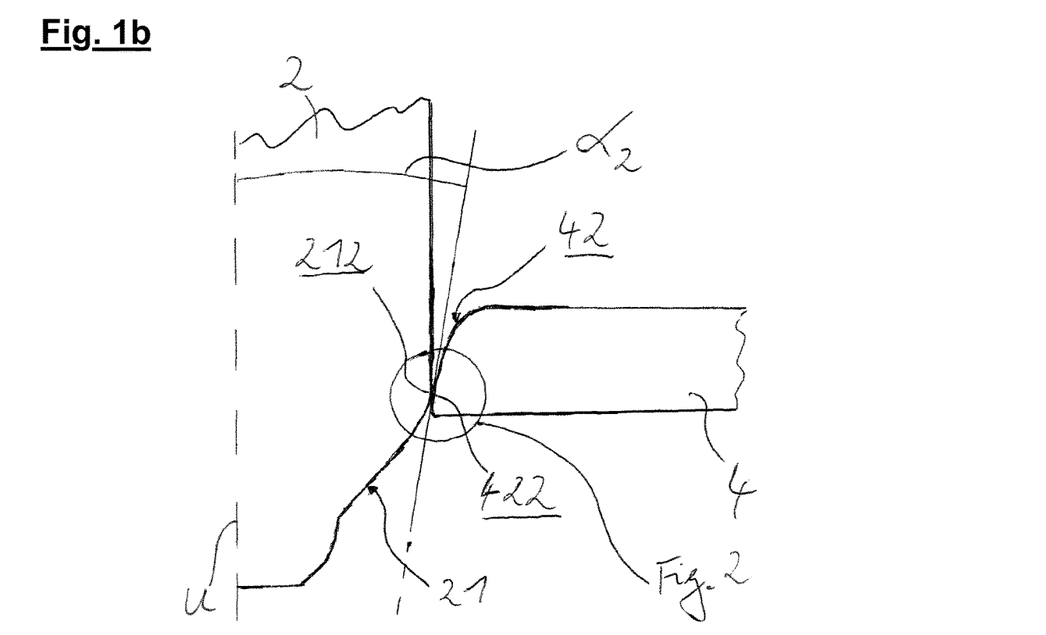

FIGS. 1a and 1b illustrate in a simple schematic manner how the transmission element 2 and the piston element 4 interact in a preferred embodiment of the brake system according to the invention. FIG. 1a here shows the preferred first state of the brake system, that is to say, in other words, the state of the brake system in which a braking operation begins or is initiated. The transmission element 2 is arranged guided in a housing (not shown) of the brake system in a manner displaceable along the transmission axis U. The piston element 4 is likewise arranged guided in the housing (not shown) in a manner displaceable substantially transversely with respect to the transmission axis U. Particularly preferably, the piston element 4 is arranged here so as to be displaceable perpendicularly to the transmission axis U and is secured or supported against displacement along the transmission axis U by means of the housing. In the first state of the brake system, the transmission element 2 lies with its transmission surface 21 against the piston element 4 in a first transmission portion 211 of the transmission surface 21. The piston element 4 lies with a first piston portion 421 of its piston surface 42 against the first transmission portion 211. Particularly preferably, the force transmission surface formed between the first transmission portion 211 and the first piston portion 421 has an inclination with respect to the transmission axis, at which can be measured with an angle $\alpha_1$ with respect to the transmission axis U. In the second state of the brake system, which is shown in FIG. 1b, the transmission element 2 has been displaced downward in the figure and the piston element 4 has been displaced to the right transversely with respect to the transmission axis U. In the second state, the transmission element 2 engages by means of a second transmission portion 212 of the transmission surface 21 on a second piston portion 422 of the piston surface 42. The force transmission surface, which is formed in the second transmission portion 212 or in the second piston portion 422, between the transmission element 2 and the piston element 4 extends here in a manner substantially pivoted about a second angle $\alpha_2$ with respect to the transmission axis U. Particularly preferably, the second angle $\alpha_2$ is smaller than the first angle $\alpha_1$. Furthermore preferably, the non-linear configuration of the curvature of the transmission surface 21 is illustrated in FIG. 1a and FIG. 1b. A preferred braking characteristic of a brake system can thus be adjusted by the displacement characteristic line between a displacement of the transmission element 2 and a displacement of the piston element 4 being adjusted via, for example, different rises of the transmission surface 21 relative to the transmission axis U. In the example of FIG. 1a and FIG. 1b, a first curvature is provided, for example, in the lower portion of the transmission element 2, said curvature being adjoined by a rectilinear or linear or conical portion, wherein, in the region in which the transmission element 2 enters into engagement with the piston element in the second state of the brake system, a second curved portion is provided, wherein the radius of curvature of the second curved portion (in each case at the top of the transmission surface 21 in FIGS. 1a and b) has a greater radius of curvature than the first curved portion arranged in the lower region. Similarly, the piston surface 42 is preferably equipped on the piston element 4 with various radii of curvature, wherein, in the first state of the brake system, a portion of the piston surface 42 preferably enters into engagement with the transmission element 2, said portion having a smaller radius of curvature than the portion of the piston surface 42 which enters into engagement with the transmission element in the second state of the brake system.

Figure 2:
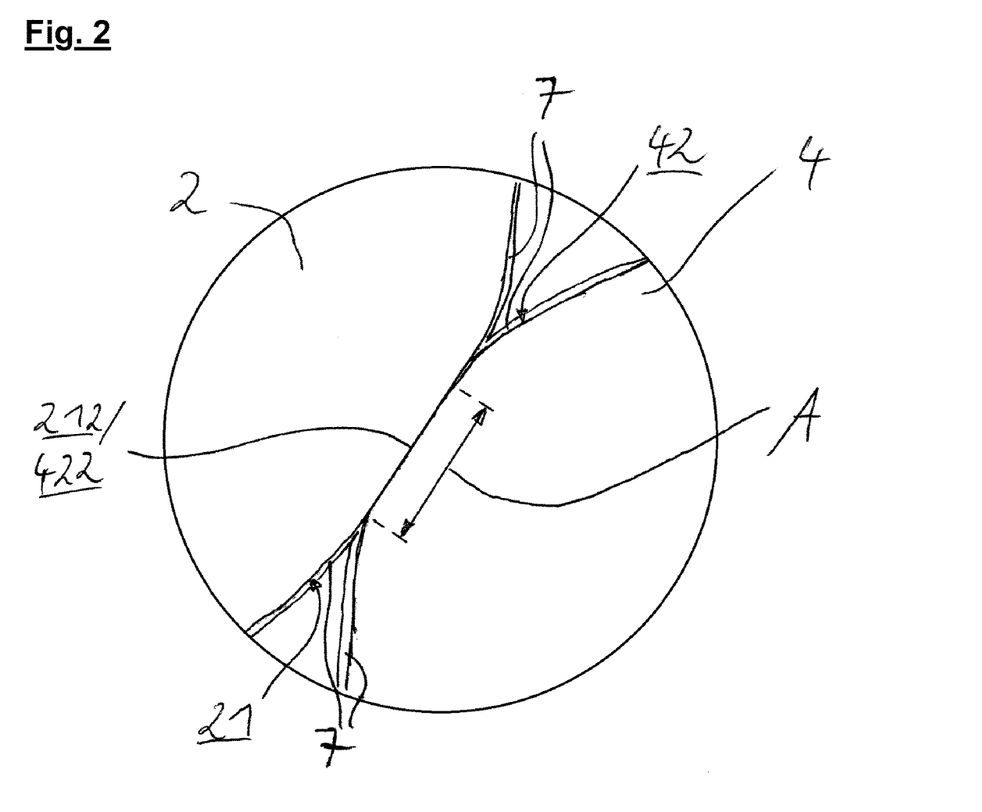
FIG. 2 shows an enlarged view of the embodiment shown in FIG. 1b.

FIG. 2 shows the geometry arranged within the circle in FIG. 1b in an enlarged view. The region between the second transmission portion 212 and the second piston portion 422 is illustrated particularly clearly here, wherein a sliding portion A which has a certain cross-sectional area via which the force is transmitted between the transmission element 2 and the piston element 4 is defined in this region. Furthermore, it is illustrated that a lubricating film 7 preferably adheres both to the transmission surface 21 and to the piston surface 42, said lubricating film also penetrating into the sliding portion A and being drawn into said sliding portion A because of the preferred curved configuration of the transmission surface 21 and the piston surface 42. It is thereby possible to significantly reduce the friction and therefore the wear and the expenditure of force at the brake system according to the invention since permanent lubrication of the respective sliding surface is established.

Figure 3:
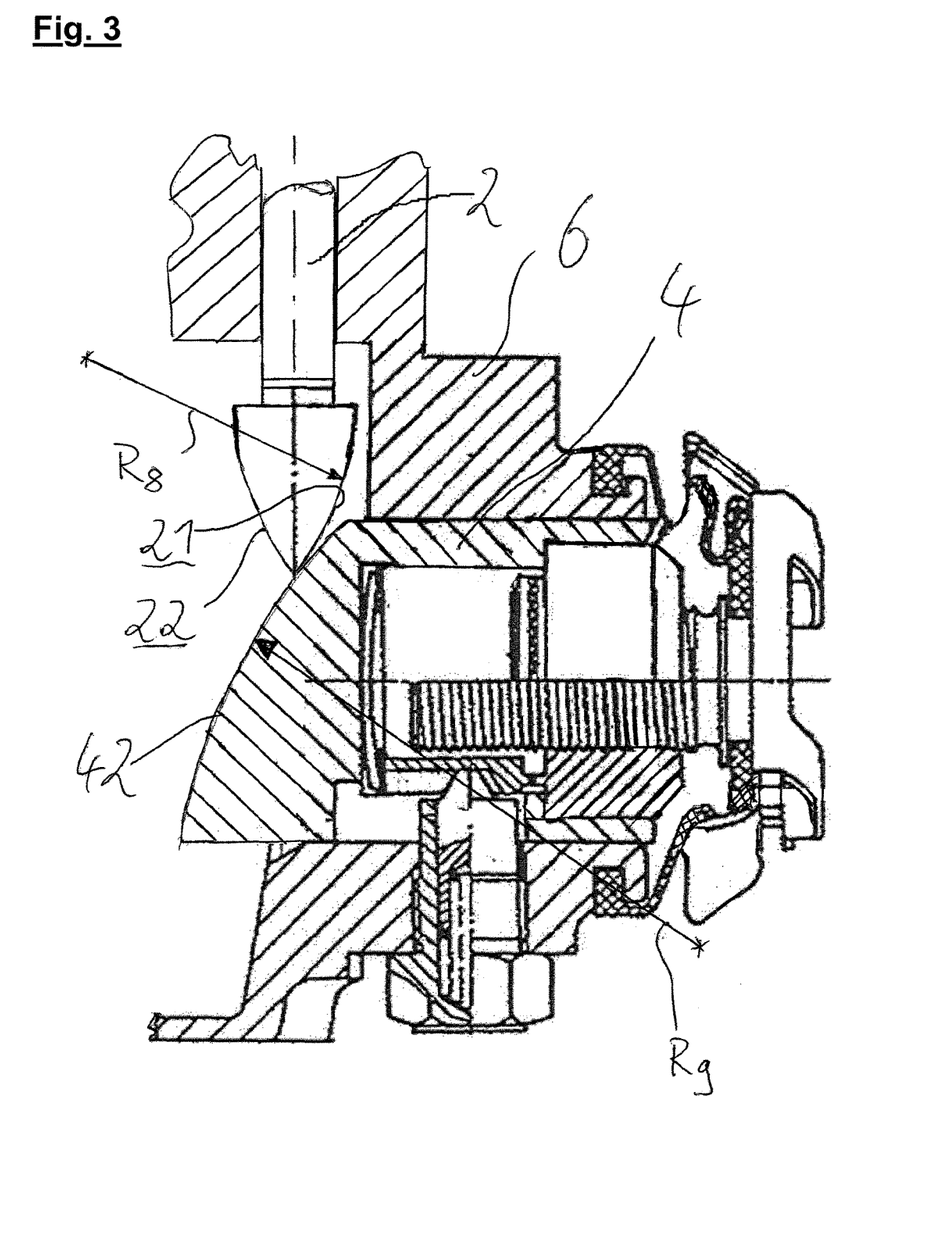
FIG. 3 shows a view of a further preferred embodiment of the brake system according to the invention.

FIG. 3 shows a preferred embodiment of the brake system according to the invention, wherein the housing 6 is shown in which the piston element 4 and the transmission element 2 are guided. The size ratio between piston element 4 and transmission element 2 is shown larger than in reality in order in particular to emphasize the curvature of the piston surface 42. It is shown in particular here that a readjustment device is preferably provided on the piston element 4 in order to compensate for wear of the brake shoes (not shown) which are displaced by the piston element 4, wherein the readjustment device can simultaneously also be provided in order to compensate for wear of the transmission surface 21 and the piston surface 42. In this preferred embodiment, both the transmission surface 21 and the piston surface 32 preferably have a uniform curvature, wherein a curvature having a first average radius of curvature $R_8$ is provided on the transmission surface 21, and wherein a curvature having a second average radius of curvature $R_9$ is provided on the piston surface 42. The first average radius of curvature is preferably smaller here than the second average radius of curvature. By means of the selection of this preferred first average radius of curvature $R_8$ and of the second average radius of curvature $R_9$, in particular a favorable geometry of the engagement surface between the transmission surface 21 and the piston surface 42 can be achieved.

Figure 4A:
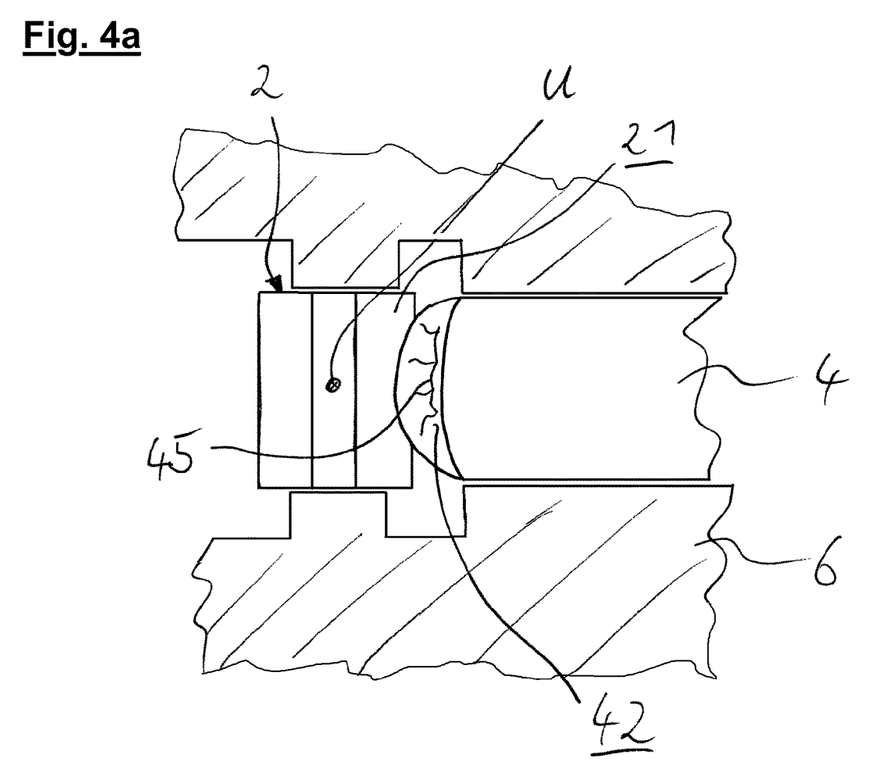
FIGS. 4a, 4b show two views of two further preferred embodiments of the brake system according to the invention.
Figure 4B:
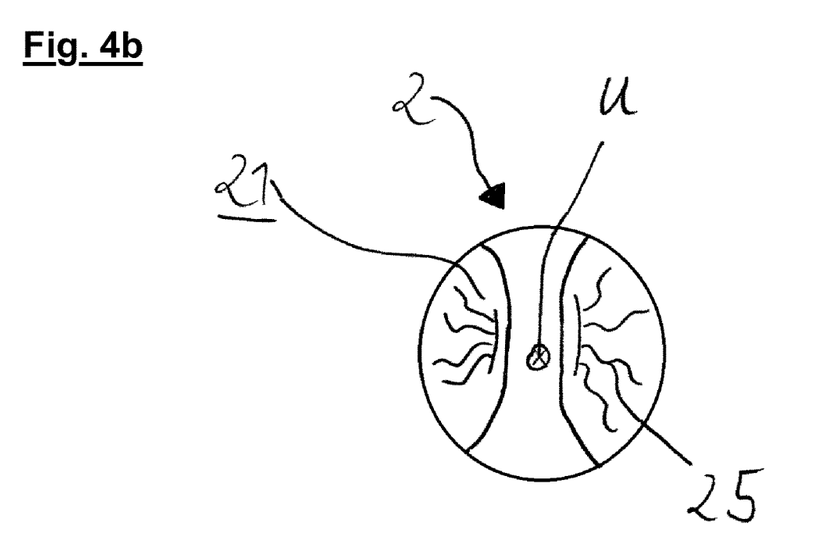

FIG. 4a and FIG. 4b show two views of preferred embodiments of the brake system according to the invention along the transmission axis U. FIG. 4a and FIG. 4b preferably show embodiments of the object shown in FIG. 3, from a second perspective. The different configuration of the transmission surface 21, which is of rectangular design as viewed from this perspective in FIG. 4a and is curved in FIG. 4b, can clearly be seen. At the same time, the piston surface 42 is of curved design in all directions transversely with respect to the transmission axis U and is therefore preferably spherical. A transmission-side receiving region 25 which serves for storing and uniformly distributing lubricant is preferably provided on the transmission surface 21. A piston-side receiving region 45 which serves for storing and uniformly distributing lubricant is preferably provided on the piston surface 42.

LIST OF REFERENCE SIGNS

2—transmission element
4—piston element
6—housing
7—lubricating film

21—(first) transmission surface
22—second transmission surface
25—transmission-side receiving region
42—piston surface
45—piston-side receiving region
211—first transmission portion
212—second transmission portion
421—first piston portion
422—second piston portion
$\alpha_1$—first angle
$\alpha_2$—second angle
A—sliding portion
$R_8$—first average radius of curvature
$R_9$—second average radius of curvature
U—transmission axis

The invention claimed is:

1. A brake system, comprising:
a transmission element; and
a piston element;
wherein the transmission element is guided displaceably along a transmission axis;
wherein the piston element is guided displaceably transversely with respect to the transmission axis;
wherein the transmission element has a transmission surface which is oriented in an inclined manner with respect to the transmission axis;
wherein the piston element is supported with a piston surface substantially directly on the transmission surface;
wherein a displacement of the transmission element along the transmission axis causes a displacement of the piston element substantially transversely with respect to the transmission axis,
wherein at least one of the transmission surface and the piston surface is curved;
wherein, in a first state of the brake system, the transmission surface in a first transmission portion lies against a first piston portion of the piston surface;
wherein, in a second state of the brake system, the transmission surface in a second transmission portion lies against a second piston portion of the piston surface;
wherein the first transmission portion extends substantially pivoted about a first angle with respect to the transmission axis;
wherein the second transmission portion extends substantially pivoted about a second angle with respect to the transmission axis; and
wherein the second angle is preferably of a smaller value than the first angle.

2. The brake system as claimed in claim 1, wherein one of the transmission surface and the piston surface has a concave curvature, wherein the other of the transmission surface and the piston surface has a convex curvature, and wherein a radius of curvature of the convex curvature is preferably smaller than a radius of curvature of the concave curvature.

3. The brake system as claimed in claim 2, wherein one of the transmission surface and the piston surface has a first curvature with a first central radius of curvature, wherein the other of the transmission surface and the piston surface has a second curvature with a second central radius of curvature, and wherein a ratio of the first central radius of curvature to the second central radius of curvature is 0.4 to 1.

4. The brake system of claim 3, wherein the ratio of the first central radius of curvature to the second central radius of curvature is 0.5 to 0.95.

5. The brake system of claim 4, wherein the ratio of the first central radius of curvature to the second central radius of curvature is 0.7 to 0.85.

6. The brake system as claimed in claim 1, wherein a profile of the curvature of at least one of the transmission surface and of the piston surface is not linear.

7. The brake system as claimed in claim 1, wherein the radius of curvature of selected portions of at least one of the transmission surface and of the piston surface has different values and/or a portion which is not curved.

8. The brake system as claimed in claim 1, wherein, when the brake system is actuated, the transmission surface and the piston surface lie on one another in a sliding portion, and wherein the sliding portion takes up 0.05 to 0.3 times an area of the transmission surface and/or the piston surface.

9. The brake systems as claimed in claim 8, wherein the sliding portion takes 0.05 to 0.2 times the area of the transmission surface and/or the piston surface.

10. The brake systems as claimed in claim 9, wherein the sliding portion takes 0.08 to 0.12 times the area of the transmission surface and/or the piston surface.

11. The brake system as claimed in claim 8, wherein a geometry of at least one of the transmission surface and of the piston surface is configured such that the sliding portion is smaller in a first state of the brake system than in a second state of the brake system.

12. The brake system as claimed in claim 1, wherein at least one of the transmission surface and the piston surface comprises a hardened material.

13. The brake system as claimed in claim 1, wherein at least one of the transmission surface comprises a transmission-side receiving region and the piston surface comprises a piston-side receiving region which is configured to provide and distribute a lubricant between the transmission surface and the piston surface.

14. The brake system as claimed in claim 1, wherein a lubricating film is located between the transmission surface and the piston surface.

15. The brake system as claimed in claim 1, wherein the transmission element has a second transmission surface which includes a plane-symmetrical configuration with respect to the transmission surface based on a plane running through the transmission axis.

16. The brake system as claimed in claim 1, wherein the transmission element is acted upon with an actuating force by a brake cylinder in order to enter into engagement with the piston element and initiate a braking operation.

17. The brake system as claimed in claim 1, further comprising:
having a housing, wherein the transmission element is arranged in the housing and is guided along the transmission axis in the housing, wherein the piston element is arranged in the housing and is guided displaceably in the housing transversely with respect to the transmission axis, and wherein the housing is integral.

* * * * *